(12) United States Patent
Huang et al.

(10) Patent No.: US 10,100,440 B2
(45) Date of Patent: *Oct. 16, 2018

(54) POLYESTER AND METHOD OF MANUFACTURING THE SAME

(71) Applicant: INDUSTRIAL TECHNOLOGY RESEARCH INSTITUTE, Hsinchu (TW)

(72) Inventors: Cheng-Jyun Huang, Taoyuan (TW); Guang-Way Jang, Hsinchu (TW); Shu-Chen Li, Yuanli Township (TW); Po-Ju Chen, Kaohsiung (TW)

(73) Assignee: INDUSTRIAL TECHNOLOGY RESEARCH INSTITTUTE, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,676

(22) Filed: Nov. 3, 2016

(65) Prior Publication Data
US 2017/0121453 A1    May 4, 2017

Related U.S. Application Data

(60) Provisional application No. 62/250,643, filed on Nov. 4, 2015.

(51) Int. Cl.
| | | |
|---|---|---|
| C08G 63/66 | (2006.01) | |
| C08G 63/80 | (2006.01) | |
| D01F 6/84 | (2006.01) | |
| C08G 63/181 | (2006.01) | |
| C08G 63/672 | (2006.01) | |

(52) U.S. Cl.
CPC ............. D01F 6/84 (2013.01); C08G 63/181 (2013.01); C08G 63/66 (2013.01); C08G 63/672 (2013.01); C08G 63/80 (2013.01)

(58) Field of Classification Search
CPC .. C08G 63/199; C08G 18/3218; C08G 63/58; C08G 63/66; C08G 63/676; C08G 64/0208; G02B 5/3033; G02B 5/3083
See application file for complete search history.

(56) References Cited

U.S. PATENT DOCUMENTS

| | | | | |
|---|---|---|---|---|
| 2,945,008 | A * | 7/1960 | Caldwell | C08G 18/3218 521/174 |
| 4,004,878 | A * | 1/1977 | Magosch | C08G 63/672 528/300 |
| 6,350,822 | B1 | 2/2002 | Van Diepen et al. | |
| 6,447,859 | B2 | 9/2002 | Oguro et al. | |
| 8,895,654 | B2 | 11/2014 | Crawford et al. | |
| 9,023,953 | B2 | 5/2015 | Nagano et al. | |
| 2010/0174044 | A1* | 7/2010 | Eritate | C08G 63/676 528/272 |

(Continued)

FOREIGN PATENT DOCUMENTS

| | | |
|---|---|---|
| CN | 101704942 A | 5/2010 |
| CN | 101831059 A | 9/2010 |

(Continued)

OTHER PUBLICATIONS

F. M. Medvedeva et al "Mixed polyesters of ethylene glycol with 2,5-furandicarboxylic and terephthalic acids", 1963.*
Taiwanese Office Action and Search Report for Taiwanese Application No. 105135673, dated Mar. 27, 2017.
Burgess et al. "Chain Mobility, Thermal, and Mechanical Properties of Poly(ethylene furanoate) Compared to Poly(ethylene terephthalate)," Macromolecules, 2014 (published Feb. 3, 2014), vol. 47, p. 1383-1391.
Forsythe et al., "Rheological properties of high melt strength poly(ethylene terephthalate) formed by reactive extrusion," Journal of Applied Polymer Science, vol. 100, 2006, p. 3646-3652.

(Continued)

*Primary Examiner* — Ling Siu Choi
*Assistant Examiner* — Gennadiy Mesh
(74) *Attorney, Agent, or Firm* — Birch, Stewart, Kolasch & Birch, LLP

(57) ABSTRACT

A polyester is copolymerized with diacid monomer, esterified diacid monomer or a combination thereof with a polyol monomer. The diacid monomer, the esterified diacid monomer or the combination thereof includes (1) furan dicarboxylic acid, dialkyl furandicarboxylate, or a combination thereof or (2) furan dicarboxylic acid, dialkyl furandicarboxylate, or a combination thereof and spiro-diacid. The polyol monomer includes (3) $C_2$-$C_{14}$ polyol or (4) $C_2$-$C_{14}$ polyol and spiro-diol of Formula (I):

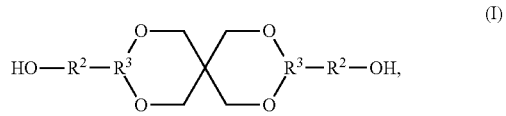

and the spiro-diacid of Formula (II):

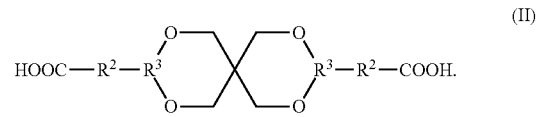

The diacid monomer, esterified diacid monomer or combination thereof and polyol monomer meet: (a) The diacid monomer, the esterified diacid monomer or combination thereof includes (2) furan dicarboxylic acid, dialkyl furandicarboxylate, or the combination thereof and spiro-diacid or (b) The polyol monomer includes (4) $C_2$-$C_{14}$ polyol and spiro-diol, and an amount of spiro-diol or spriro-diacid is 500 ppm to 2000 ppm based on a weight of furan dicarboxylic acid, dialkyl furandicarboxylate, or combination thereof.

8 Claims, No Drawings

(56) References Cited

U.S. PATENT DOCUMENTS

| | | | |
|---|---|---|---|
| 2015/0064383 A1 | 3/2015 | Kriegel et al. | |
| 2017/0121859 A1* | 5/2017 | Huang | D01F 6/84 |

FOREIGN PATENT DOCUMENTS

| | | | |
|---|---|---|---|
| CN | 102432847 A | 5/2012 | |
| CN | 103665788 A | 3/2014 | |
| CN | 104321363 A | 1/2015 | |
| JP | 2009286743 A | 12/2009 | |
| WO | WO 2012/005647 A1 | 1/2012 | |
| WO | WO 2012/005648 A1 | 1/2012 | |
| WO | WO 2014/204313 A1 | 12/2014 | |
| WO | WO 2015/031910 A1 | 3/2015 | |

OTHER PUBLICATIONS

Hudson et al., "Synthesis and Characterization of Nonlinear PETs Produced via a Balance of Branching and End-Capping," Macromolecules, 2000 (published on web Nov. 18, 2000), vol. 33, No. 25, p. 9255-9261.

Jansen et al., "Reaction Kinetics of the Incorporation of 2,2-Bis[4-(2-hydroxyethoxy)phenyl]propane in Poly(butylene terephthalate) via Solid-State Polymerization," Macromolecules, 2005 (published on web Mar. 8, 2005), vol. 38, No. 7, p. 2659-2664.

Raffa et al., "Chain extension and branching of poly(ethylene terephthalate) (PET) with di- and multifunctional epoxy or isocyanate additives: An experimental and modelling study," Elsevier, Reactive & Functional Polymers, vol. 72, 2012 (available online Oct. 24, 2011), p. 50-60.

Yoon et al., "Effect of multifunctional comonomers on the properties of poly(ethylene terephthalate) copolymers," Polymer International, vol. 51, 2002, p. 134-139.

Chinese Office Action in corresponding Application No. CN201610959041.2 dated May 21, 2018.

* cited by examiner

POLYESTER AND METHOD OF MANUFACTURING THE SAME

CROSS REFERENCE TO RELATED APPLICATIONS

This application claims the benefit of U.S. Provisional Application No. 62/250,643 filed on Nov. 4, 2015, the entirety of which is incorporated by reference herein.

TECHNICAL FIELD

The technical field relates to a polyester and a method for manufacturing the same.

BACKGROUND

Polyethylene terephthalate (PET) has excellent properties and wide applications, which is a basic raw material in many industrial products. However, the raw materials of PET depend on a petroleum source, and biomass-plastic seems to be a good choice to replace the PET. More research is required to focus on developing the biomass-plastic, which may save the precious and gradually exhausted petroleum resources for a more valuable application in the future.

However, the material properties of the biomass-plastic should be improved when it is processed. In other words, a biomass-plastic with excellent processability is called for.

SUMMARY

One embodiment of the disclosure provides a polyester, being copolymerized of a diacid monomer, an esterified diacid monomer, or a combination thereof and a polyol monomer, wherein the diacid monomer, the esterified diacid monomer, or the combination thereof includes (1) furan dicarboxylic acid, dialkyl furandicarboxylate, or a combination thereof or (2) furan dicarboxylic acid, dialkyl furandicarboxylate, or a combination thereof and spiro-diacid, and the polyol monomer comprises (3) $C_2$-$C_{14}$ polyol or (4) $C_2$-$C_{14}$ polyol and spiro-diol, wherein the spiro-diol has a Formula (I):

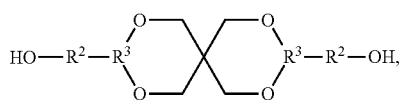
(I)

and the spiro-diacid has a Formula (II):

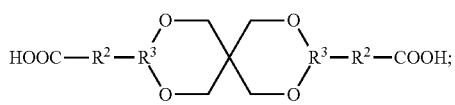
(II)

wherein each $R^2$ is independently single bond,

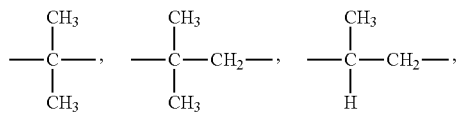

or $C_1$-$C_4$ linear alkylene; each $R^3$ is independently

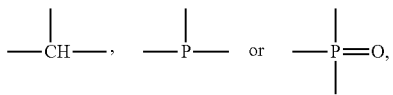

and wherein the diacid monomer, the esterified diacid monomer, or the combination thereof and the polyol monomer meet the following conditions: (a) the diacid monomer, the esterified diacid monomer or the combination thereof comprises (2) furan dicarboxylic acid, dialkyl furandicarboxylate, or the combination thereof and spiro-diacid or (b) the polyol monomer comprises (4) $C_2$-$C_{14}$ polyol and spiro-diol.

One embodiment of the disclosure provides a method of manufacturing polyester, comprising: mixing a diacid monomer, an esterified diacid monomer, or a combination thereof with a polyol monomer to perform an esterification and a condensation polymerization for forming a prepolymer; and performing a solid-state polymerization of the prepolymer to form the polyester, wherein the diacid monomer, the esterified diacid monomer, or the combination thereof includes (1) furan dicarboxylic acid, dialkyl furandicarboxylate, or a combination thereof or (2) furan dicarboxylic acid, dialkyl furandicarboxylate, or a combination thereof and spiro-diacid, and the polyol monomer comprises (3) $C_2$-$C_{14}$ polyol or (4) $C_2$-$C_{14}$ polyol and spiro-diol, wherein the spiro-diol has a Formula (I):

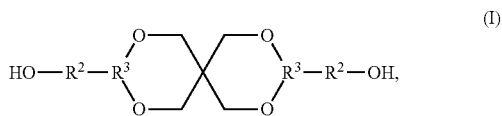
(I)

and the spiro-diacid has a Formula (II):

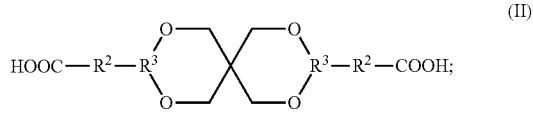
(II)

wherein each $R^2$ is independently single bond,

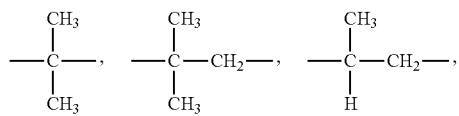

or $C_1$-$C_4$ linear alkylene; each $R^3$ is independently

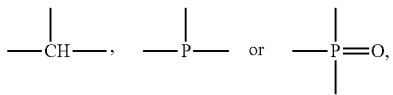

and wherein the diacid monomer, the esterified diacid monomer, or the combination thereof and the polyol monomer meet the following conditions: (a) the diacid monomer, the esterified diacid monomer or the combination thereof comprises (2) furan dicarboxylic acid, dialkyl furandicarboxylate, or the combination thereof and spiro-diacid or (b) the polyol monomer comprises (4) $C_2$-$C_{14}$ polyol and spiro-diol.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In one embodiment, a polyester is made by copolymerization of a diacid monomer, an esterified diacid monomer, or a combination thereof with a polyol monomer. In one embodiment, the diacid monomer, the esterified diacid monomer, or the combination thereof is mixed with the polyol monomer, and an esterification and a condensation polymerization of the mixture are performed to form a prepolymer. A solid-state polymerization of the prepolymer is performed to form the polyester.

In one embodiment, the diacid monomer, the esterified diacid monomer, or the combination thereof includes (1) furan dicarboxylic acid, dialkyl furandicarboxylate, or a combination thereof, or (2) furan dicarboxylic acid, dialkyl furandicarboxylate, or a combination thereof and spiro-diacid.

In one embodiment, the furan dicarboxylic acid includes 2,5-furan dicarboxylic acid, 3,4-furan dicarboxylic acid, 2,3-furan dicarboxylic acid, or a combination thereof. The dialkyl furandicarboxylate includes dimethyl furan-2,5-dicarboxylate, dimethyl furan-3,4-dicarboxylate, dimethyl furan-2,3-dicarboxylate, or a combination thereof. The spiro-diacid has a Formula (II):

$$HOOC-R^2-R^3 \underset{O}{\overset{O}{\bigotimes}} R^3-R^2-COOH; \qquad (II)$$

wherein each $R^2$ is independently single bond,

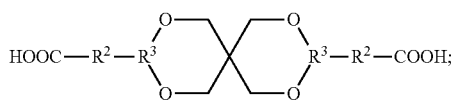

or $C_1$-$C_4$ linear alkylene, and each $R^3$ is independently

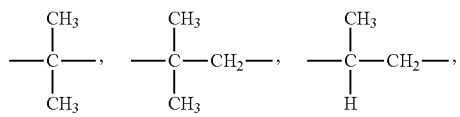

In one embodiment, the polyol monomer includes (3) $C_2$-$C_{14}$ polyol or (4) $C_2$-$C_{14}$ polyol and spiro-diol.

In one embodiment, the $C_2$-$C_{14}$ polyol includes ethylene glycol, 1,3-propylene glycol, glycerol, 1,4-butylene glycol, 1,5-pentylene glycol, neo-pentylene glycol, 1,6-hexylene glycol, 1,7-heptylene glycol, 1,8-octylene glycol, 1,9-nonylene glycol, decylene glycol, undecylene glycol, dodecylene glycol, tetradecylene glycol, rosin-diol, isosorbide, 2,5-furandiol, or a combination thereof. The spiro-diol has a Formula (I):

$$HO-R^2-R^3 \underset{O}{\overset{O}{\bigotimes}} R^3-R^2-OH, \qquad (I)$$

wherein each $R^2$ is independently single bond,

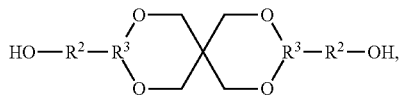

or $C_1$-$C_4$ linear alkylene, and each $R^3$ is independently

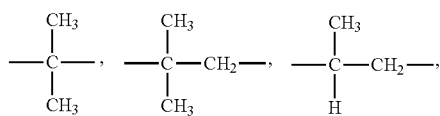

In one embodiment, the diacid monomer, the esterified diacid monomer, or the combination thereof, and the polyol monomer are selected to meet condition (a) or condition (b). In condition (a), the diacid monomer, the esterified diacid monomer, or the combination thereof includes (2) furan dicarboxylic acid, dialkyl furandicarboxylate, or a combination thereof and spiro-diacid. In condition (b), the polyol monomer includes (4) $C_2$-$C_{14}$ polyol and spiro-diol.

In one embodiment, the esterification includes transesterification and direct esterification. The esterification and the condensation polymerization can be catalyzed by an appropriate catalyst, and the catalyst content ranges from about 25 ppm to 500 ppm on the basis of the reactants. In one embodiment, the catalyst can be a metal catalyst that is tin-based, antimony-based, gallium-based, aluminum-based, titanium-based, germanium-based, lithium-based, magnesium-based, manganese-based, cobalt-based, or a combination thereof. For example, the catalyst can be titanium-based solid catalyst, titanium isopropoxide, titanium isobutoxide, or a combination thereof. The esterification and the condensation polymerization can be respectively reacted at a temperature of about 170° C. to 260° C. for a period of about 1 hour to 8 hours.

After the esterification and the condensation polymerization, the prepolymer is obtained for further solid-state polymerization. The solid-state polymerization is performed at a temperature of about 170° C. to 210° C. for a period of about 4 hours to 120 hours (or about 16 hours to 56 hours). The solid-state polymerization easily causes thermal degradation yellowing (and melting adhesive lump) due to an overly high temperature or an overly long period. The molecular weight of the branched polyester cannot be efficiently increased by an overly low temperature or an overly short period of the solid-state polymerization.

In one embodiment, the prepolymer is further re-crystallized before the solid-state polymerization. The re-crystallization is performed at a temperature of about 110° C. to 170° C. (e.g. about 130° C. to 160° C.) for a period of about 0.5 hour to 2 hours. Optionally, the solid obtained from the re-crystallization is cracked to form powder for the solid-state polymerization.

In one embodiment, the spiro-diacid or the spiro-diol is ring-opened to branch the prepolymer for forming a branched polyester. The branched polyester has a higher molecular weight and a higher zero shear viscosity than the polyester before being branched. For example, when $R^2$ is

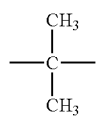

and $R^3$ is

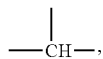

the solid-state polymerization is shown below, in which P' is the other parts of the polyester.

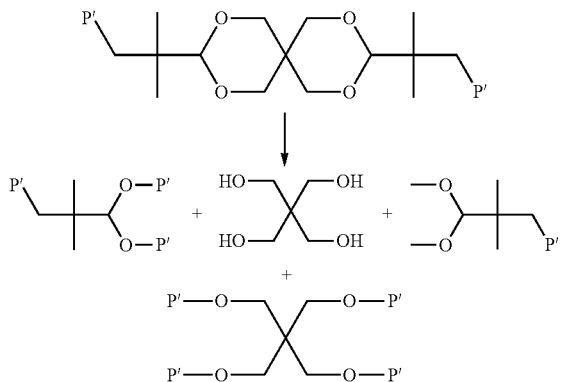

In one embodiment, the spiro-diacid or spiro-diol may make the polyester have excellent zero shear viscosity after the solid-state polymerization. The polyester is beneficial for a molding process (e.g. injection molding, extrusion molding, or blow molding) for several products (e.g. container, film, or foam). The polyester may mitigate or eliminate the problem of parison sagging during the molding process.

In some embodiments, the diacid monomer, the esterified diacid monomer, or the combination thereof includes 1 part by mole of (1) furan dicarboxylic acid, dialkyl furandicarboxylate, or the combination thereof, and the polyol monomer includes 1 to 3 parts by mole of (4) $C_2$-$C_{14}$ polyol and spiro-diol. The furan dicarboxylic acid, dialkyl furandicarboxylate, or a combination thereof and the spiro-diol have a molar ratio of 1:0.0003023 to 1:0.0012092. Too much spiro-diol easily results in gelation, which is unfavorable in processing. Too little spiro-diol cannot efficiently enhance the zero shear viscosity of the product.

In one embodiment, the diacid monomer, the esterified diacid monomer, or the combination thereof includes 1 part by mole of (2) furan dicarboxylic acid, dialkyl furandicarboxylate, or the combination thereof and spiro-diacid, and the polyol monomer includes 1 to 3 parts by mole of (3) $C_2$-$C_{14}$ polyol. The furan dicarboxylic acid, dialkyl furandicarboxylate, or the combination thereof and the spiro-diacid have a molar ratio of about 99.998:0.002 to 99.9999:0.0001, or about 99.9985:0.0015 to 99.9997:0.0003. Too much spiro-diacid easily results in gelation, which is unfavorable in processing. Too little spiro-diacid cannot efficiently enhance the zero shear viscosity of the product.

In one embodiment, the branched polyester can be further blended with another polyester to form a blend if necessary.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In following experiments, the rheological behavior of the polyesters at steady-state was measured by Anton Paar Physica MCR 301, in which the shear rate was measured between 1000 $s^{-1}$ to 0.001 $s^{-1}$ in a parallel plate geometry with an interval of 1.0 mm. Each of a series of measurement points (total 15 points) was measured for 50 seconds. When the polyol monomer of the polyester was ethylene glycol, the above measurement was performed at 250° C. When the polyol monomer of the polyester was propylene glycol or butylene glycol, the above measurement was performed at 210° C.

Example 1

1 part by mole of dimethyl furan-2,5-dicarboxylate, 2.5 parts by mole of ethylene glycol, 500 ppm of 3,9-bis(1,1-dimethyl-2-hydroxyethyl)-2,4,8,10-tetraoxaspiro[5.5]undecane (abbreviated as SPG monomer, on the weight basis of the dimethyl furan-2,5-dicarboxylate, about 0.03023 mol %), and 100 ppm of titanium-based solid catalyst (C-94, commercially available from World Chem Industries Co., Ltd, on the weight basis of the dimethyl furan-2,5-dicarboxylate) were put into a reaction tank. A condensing device and a methanol collecting cylinder were assembled with the reaction tank. The reaction tank was flushed and filled by nitrogen, and the mixture was heated to 190° C. in a salt bath, and stirred at 200 rpm by a rotator to perform a transesterification. After the catalyst was completely dissolved, methanol started to condense on the condenser. The transesterification was performed continuously for 3 hours, the condensed methanol was removed, and 0.1 wt % of an anti-oxidant (Irganox 1010, commercially available from BASF, on the weight basis of the dimethyl furan-2,5-dicarboxylate) was then added into the reaction tank. The pressure of the reaction tank was then gradually reduced to 50 torr in 30 minutes to remove the excess ethylene glycol. The salt bath temperature was gradually heated to 230° C., and the reaction pressure was gradually reduced to less than 1 torr to perform a condensation polymerization for 60 minutes. Finally, the vacuum of the condensation polymerization was broken by nitrogen, and the heating and the stirring were stopped. A cap of the reaction tank was then opened, and a viscous product was then obtained.

The viscous product was re-crystallized at 150° C. for 1 hour, then crushed by a crushing machine, and then separated by a sieve screen to collect powders with a size of less than 25 mesh for further solid-state polymerization. The powder was put into a reaction tank, and heated to 200° C. in a salt bath to perform the solid-state polymerization for 48 hours, in which the reaction pressure is less than 1 torr.

Finally, a branched polyester was obtained, and its properties such as viscosity and rheological behavior were analyzed and tabulated in Table 1.

Examples 2 and 3

Examples 2 and 3 were similar to Example 1, and the differences in Examples 2 and 3 were the SPG monomer amounts. The SPG monomer amounts and the product properties were tabulated in Table 1.

Comparative Example 1

Comparative Example 1 was similar to Example 1, and the difference in Comparative Example 1 was free of the SPG monomer. The product properties were tabulated in Table 1.

Comparative Example 2

Comparative Example 2 was similar to Example 1, and the differences in Comparative Example 2 was the SPG monomer being replaced with 1000 ppm of another spiro-compound (Irgafos 126, commercially available from BASF, on the weight basis of the dimethyl furan-2,5-dicarboxylate). The product properties were tabulated in Table 1. The chemical structure of Irgafos 126 is shown below.

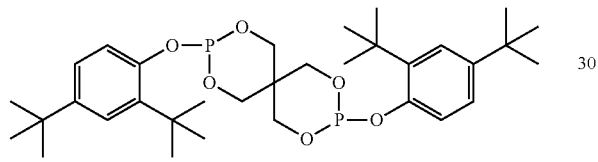

Comparative Example 3

Comparative Example 3 was similar to Example 1, and the differences in Comparative Example 3 was the SPG monomer being replaced with 1000 ppm of another aromatic compound (Irgafos 168, commercially available from BASF, on the weight basis of the dimethyl furan-2,5-dicarboxylate). The product properties were tabulated in Table 1. The chemical structure of Irgafos 168 is shown below.

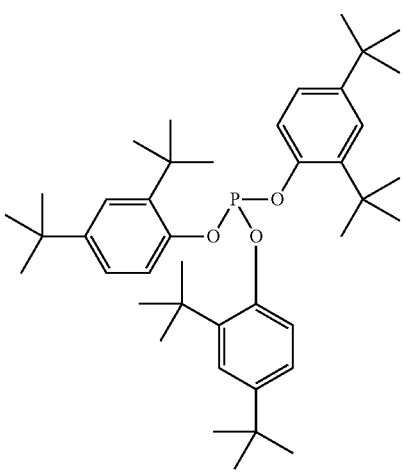 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

TABLE 1

| | Example 1 | Example 2 | Example 3 | Comparative Example 1 | Comparative Example 2 | Comparative Example 3 |
| --- | --- | --- | --- | --- | --- | --- |
| SPG monomer (ppm) | 500 | 1000 | 1500 | 0 | 0 (1000 ppm Irgafos 126) | 0 (1000 ppm Irgafos 168) |
| Solid-state polymerization period (hrs) | 48 | 48 | 48 | 48 | 48 | 48 |
| Inherent viscosity before solid-state polymerization (dL/g) | 0.280 | 0.276 | 0.255 | 0.283 | 0.275 | 0.271 |
| Inherent viscosity after solid-state polymerization (dL/g) | 0.880 | 0.867 | 1.109 | 0.951 | 0.982 | 0.792 |
| Zero shear viscosity after solid-state polymerization (Pa·s) | 210 | 470 | 657 | 83.4 | 90.6 | 73.3 |

As shown in Table 1, the zero shear viscosity after solid state polymerization of Examples 1 to 3 were significantly higher than that of Comparative Example 1, which explained that the SPG monomer significantly increased the zero shear viscosity of the polyester after solid-state polymerization, thereby achieving an excellent processability of the polyester. Furthermore, the inherent viscosities of the products after solid-state polymerization were increased whether the SPG monomer was added or not. However, the Examples utilizing the SPG monomer may achieve the excellent zero shear viscosity. For example, the spiro-compound (not the spiro-diol) in Comparative Example 2 cannot achieve an excellent zero shear viscosity.

Example 4

1 part by mole of dimethyl furan-2,5-dicarboxylate, 2.5 parts by mole of ethylene glycol, 1500 ppm of SPG monomer (on the weight basis of the dimethyl furan-2,5-dicarboxylate, about 0.09069 mol %), and 100 ppm of titanium-based solid catalyst (C-94, commercially available from World Chem Industries Co., Ltd, on the weight basis of the dimethyl furan-2,5-dicarboxylate) were put into a reaction tank. A condensing device and a methanol collecting cylinder were assembled with the reaction tank. The reaction tank was flushed and filled by nitrogen, and the mixture was heated to 190° C. in a salt bath, and stirred at 200 rpm by a rotator to perform a transesterification. After the catalyst was completely dissolved, methanol started to condense on the condenser. The transesterification was performed continuously for 3 hours, the condensed methanol was removed, and 0.1 wt % of an anti-oxidant (Irganox 1010, commercially available from BASF, on the weight basis of the dimethyl furan-2,5-dicarboxylate) was then added into the reaction tank. The pressure of the reaction tank was then gradually reduced to 50 torr in 30 minutes to remove the excess ethylene glycol. The salt bath temperature was gradually heated to 230° C., and the reaction pressure was gradually reduced to less than 1 torr to perform a condensation polymerization for 60 minutes. Finally, the vacuum of the condensation polymerization was broken by nitrogen, and the heating and the stirring were stopped. A cap of the reaction tank was then opened, and a viscous product was then obtained.

The viscous product was re-crystallized at 150° C. for 1 hour, then crushed by a crushing machine, and then separated by a sieve screen to collect powders with a size of less than 25 mesh for a further solid-state polymerization. 6 g of the powder was put into a reaction tank, and heated to 200° C. in a salt bath to perform the solid-state polymerization for 24 hours, in which the reaction pressure was less than 1 torr. Finally, a branched polyester was obtained, and its properties such as viscosity and rheological behavior were analyzed and tabulated in Table 2.

Example 5

Example 5 was similar to Example 4, and the difference in Example 5 was the SPG monomer amounts. The SPG monomer amount and the product properties were tabulated in Table 2.

Comparative Example 4

Comparative Example 4 was similar to Comparative Example 1, and the difference in Comparative Example 4 was the solid-state polymerization period being reduced to 24 hours. The product properties were tabulated in Table 2.

TABLE 2

|  | Example 4 | Example 5 | Comparative Example 4 |
|---|---|---|---|
| SPG monomer(ppm) | 1500 | 2000 | 0 |
| Solid-state polymerization period (hrs) | 24 | 24 | 24 |
| Inherent viscosity of the polyester before solid-state polymerization (dL/g) | 0.255 | 0.267 | 0.253 |
| Inherent viscosity of the polyester after solid-state polymerization (dL/g) | 0.686 | 0.418 | 0.724 |
| Zero shear viscosity after solid-state polymerization (Pa · s) | 112 | 410 | 35.6 |

As shown in Table 2, the zero shear viscosities of the products in Examples 4 and 5 were significantly higher than that of the product in Comparative Example 4. The SPG monomer may greatly increase the zero shear viscosity of the polyester after the solid-state polymerization, such that the polyester with the SPG monomer may have excellent processability.

Comparative Example 5

Comparative Example 5 was similar to Example 2, and the differences were the solid-state polymerization period being reduced to 24 hours, and the SPG monomer being replaced with pentaerythritol (PENTA). The product properties were tabulated in Table 3.

TABLE 3

|  | Comparative Example 5 |
|---|---|
| SPG monomer (ppm) | 1000 (PENTA) |
| Polyol monomer | Ethylene glycol |
| Solid-state polymerization period (hrs) | 24 |
| Inherent viscosity of the polyester before solid-state polymerization (dL/g) | 0.250 |
| Inherent viscosity of the polyester after solid-state polymerization (dL/g) | Gel |
| Zero shear viscosity after solid-state polymerization (Pa · s) | NA |

As shown in Table 3, using PENTA instead of the SPG monomer in Comparative Example 5 resulted in a gelled product. In the Examples of the disclosure, the diacid monomer, the esterified diacid monomer, or a combination thereof, the SPG monomer and the polyol monomer can be mixed and then be reacted together to obtain the polyester having an excellent zero shear viscosity and the reaction was free of gelation.

Example 6

1 part by mole of dimethyl furan-2,5-dicarboxylate, 2.5 parts by mole of 1,3-propylene glycol, 1000 ppm of SPG monomer (on the weight basis of the dimethyl furan-2,5-dicarboxylate, about 0.06046 mol %), and 200 ppm of titanium-based solid catalyst (C-94, commercially available from World Chem Industries Co., Ltd, on the weight basis of the dimethyl furan-2,5-dicarboxylate) were put into a reaction tank. A condensing device and a methanol collecting cylinder were assembled with the reaction tank. The reaction tank was flushed and filled by nitrogen, and the mixture was heated to 190° C. in a salt bath, and stirred at 200 rpm by a rotator to perform transesterification. After the catalyst was completely dissolved, methanol started to condense on the condenser. The transesterification was performed continuously for 3 hours, the condensed methanol was removed, and 0.1 wt % of an anti-oxidant (Irganox 1010, commercially available from BASF, on the weight basis of the dimethyl furan-2,5-dicarboxylate) was then added into the reaction tank. The pressure of the reaction tank was then gradually reduced to 50 torr in 30 minutes to remove the excess 1,3-propylene glycol. The salt bath temperature was gradually heated to 230° C., and the reaction pressure was gradually reduced to less than 1 torr to perform a condensation polymerization for 180 minutes. Finally, the vacuum of the condensation polymerization was broken by nitrogen, and the heating and the stirring were stopped. A cap of the reaction tank was then opened, and a viscous product was then obtained.

The viscous product was re-crystallized at 120° C. for 1 hour, then crushed by a crushing machine, and then separated by a sieve screen to collect powders with a size of less than 25 mesh for a further solid-state polymerization. 6 g of the powder was put into a reaction tank, and heated to 160° C. by a salt bath to perform the solid-state polymerization for 48 hours, in which the reaction pressure is less than 1 torr. Finally, a branched polyester was obtained, and its properties such as viscosity and rheological behavior were analyzed and tabulated in Table 3.

Comparative Example 6

Comparative Example 6 was similar to Example 6, and the difference in Comparative Example 6 was free of the SPG monomer. The product properties were tabulated in Table 4.

TABLE 4

|  | Example 6 | Comparative Example 6 |
| --- | --- | --- |
| SPG monomer (ppm) | 1000 | 0 |
| Polyol monomer | 1,3-propylene glycol | 1,3-propylene glycol |
| Solid-state polymerization period (hrs) | 48 | 48 |
| Inherent viscosity of the polyester before solid-state polymerization (dL/g) | 0.480 | 0.450 |
| Inherent viscosity of the polyester after solid-state polymerization (dL/g) | 1.260 | 0.774 |
| Zero shear viscosity after solid-state polymerization (Pa · s) | 9,500 | 920 |

As shown in Table 4, the zero shear viscosity of the product in Example 6 was significantly higher than that of the product in Comparative Example 6. The SPG monomer may greatly increase the zero shear viscosity of the polyester after the solid-state polymerization, such that the polyester with the SPG monomer may have excellent processability.

Example 7

Example 7 was similar to Example 6, and the differences were the 1,3-propylene glycol being replaced with 1,4-butylene glycol, and the condensation polymerization was performed at 240° C. The product properties are listed in Table 5.

TABLE 5

|  | Example 7 |
| --- | --- |
| SPG monomer (ppm) | 1000 |
| Polyol monomer | 1,4-butylene glycol |
| Solid-state polymerization period (hrs) | 48 |
| Inherent viscosity of the polyester before solid-state polymerization (dL/g) | 0.826 |
| Inherent viscosity of the polyester after solid-state polymerization (dL/g) | 0.937 |
| Zero shear viscosity after solid-state polymerization (Pa · s) | 315 |

As shown in Table 5, the polyester after solid-state polymerization had an excellent zero shear viscosity when the polyol was butylene glycol.

Comparative Example 7

Comparative Example 7 was similar to Example 2, and the difference in Comparative Example 7 was the furan-2,5-dicarboxylate and the ethylene glycol being melt polymerized, and then melt blended with the SPG monomer to perform the solid-state polymerization for 24 hours. The polyester before the solid-state polymerization with the SPG monomer had an inherent viscosity of 0.394 dL/g, and the polyester after the solid-state polymerization with the SPG monomer had an inherent viscosity of 0.538 dL/g. The polyester properties are tabulated in Table 6.

TABLE 6

|  | Comparative Example 7 |
| --- | --- |
| SPG monomer (ppm) | 1000 |
| Solid-state polymerization period (hrs) | 24 |
| Inherent viscosity of the polyester before solid-state polymerization (dL/g) | 0.394 |
| Inherent viscosity of the polyester after solid-state polymerization (dL/g) | 0.538 |
| Zero shear viscosity after solid-state polymerization (Pa · s) | 81.8 |

In Examples of the disclosure, the spiro-diacid or the spiro-diol was used to make the polyesters after the solid-state polymerization have excellent zero shear viscosity. As such, the polyesters were beneficial in the molding process, and further solved the problem of parison sagging during the molding process of some applications. In some Examples, the polyesters had a zero shear viscosity of 100 Pa·s 10000 Pa·s at a temperature of 210° C. or 250° C., which could be more beneficial in the molding process.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A polyester, being copolymerized of a diacid monomer, an esterified diacid monomer, or a combination thereof and a polyol monomer,
   wherein the diacid monomer, the esterified diacid monomer, or the combination thereof consists essentially of (1) furan dicarboxylic acid, dialkyl furandicarboxylate, or a combination thereof or (2) furan dicarboxylic acid, dialkyl furandicarboxylate, or a combination thereof and spiro-diacid, and the polyol monomer comprises (3) $C_2$-$C_{14}$ polyol or (4) $C_2$-$C_{14}$ polyol and spiro-diol, wherein the spiro-diol has a Formula (I):

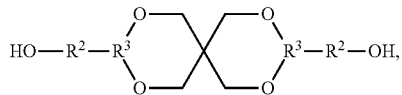 (I)

and the spiro-diacid has a Formula (II):

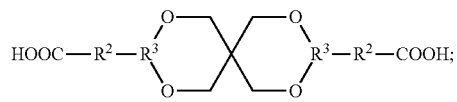 (II)

wherein each $R^2$ is independently single bond,

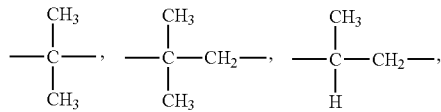

or $C_1$-$C_4$ linear alkylene;

each $R^3$ is independently

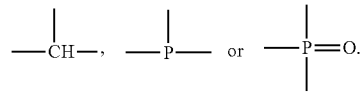

and wherein the diacid monomer, the esterified diacid monomer, or the combination thereof and the polyol monomer meet the following conditions: (a) the diacid monomer, the esterified diacid monomer or the combination thereof comprises (2) furan dicarboxylic acid, dialkyl furandicarboxylate, or the combination thereof and spiro-diacid or (b) the polyol monomer comprises (4) $C_2$-$C_{14}$ polyol and spiro-diol, and wherein when the diacid monomer, the esterified diacid monomer, or the combination thereof includes 1 part by mole of (1) furan dicarboxylic acid, dialkyl furandicarboxylate, or the combination thereof, and the polyol monomer includes 1 to 3 parts by mole of (4) $C_2$-$C_{14}$ polyol and spiro-diol, an amount of the spiro-diol is 500 ppm to 2000 ppm based on a weight of the furan dicarboxylic acid, dialkyl furandicarboxylate, or the combination thereof, and wherein when the diacid monomer, the esterified diacid monomer, or the combination thereof includes 1 part by mole of (2) furan dicarboxylic acid, dialkyl furandicarboxylate, or the combination thereof and the spiro-diacid, and the polyol monomer includes 1 to 3 parts by mole of (3) $C_2$-$C_{14}$ polyol, an amount of the spiro-diacid is 500 ppm to 2000 ppm based on a weight of the furan dicarboxylic acid, dialkyl furandicarboxylate, or the combination thereof.

2. The polyester as claimed in claim 1, wherein the furan dicarboxylic acid includes 2,5-furan dicarboxylic acid, 3,4-furan dicarboxylic acid, 2,3-furan dicarboxylic acid, or a combination thereof.

3. The polyester as claimed in claim 1, wherein the dialkyl furandicarboxylate includes dimethyl furan-2,5-dicarboxylate, dimethyl furan-3,4-dicarboxylate, dimethyl furan-2,3-dicarboxylate, or a combination thereof.

4. The polyester as claimed in claim 1, wherein the $C_2$-$C_{14}$ polyol includes ethylene glycol, 1,3-propylene glycol, glycerol, 1,4-butylene glycol, 1,5-pentylene glycol, neo-pentylene glycol, 1,6-hexylene glycol, 1,7-heptylene glycol, 1,8-octylene glycol, 1,9-nonylene glycol, decylene glycol, undecylene glycol, dodecylene glycol, tetradecylene glycol, rosin-diol, isosorbide, 2,5-furandiol, or a combination thereof.

5. A method of manufacturing the polyester according to claim 1, comprising:

mixing a diacid monomer, an esterified diacid monomer, or a combination thereof with a polyol monomer to perform an esterification and a condensation polymerization for forming a prepolymer; and performing a solid-state polymerization of the prepolymer to form the polyester, wherein the diacid monomer, the esterified diacid monomer, or the combination thereof consists essentially of (1) furan dicarboxylic acid, dialkyl furandicarboxylate, or a combination thereof or (2) furan dicarboxylic acid, dialkyl furandicarboxylate, or a combination thereof and spiro-diacid, and the polyol monomer comprises (3) $C_2$-$C_{14}$ polyol or (4) $C_2$-$C_{14}$ polyol and spiro-diol, wherein the spiro-diol has a Formula (I):

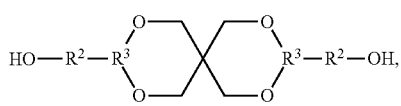 (I)

and the spiro-diacid has a Formula (II):

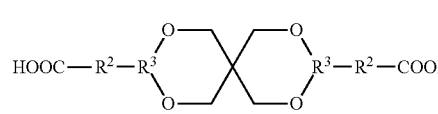 (II)

wherein each $R^2$ is independently single bond,

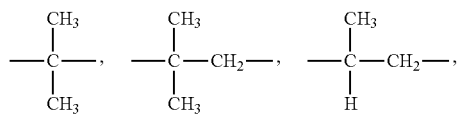

or $C_1$-$C_4$ linear alkylene;

each $R^3$ is independently

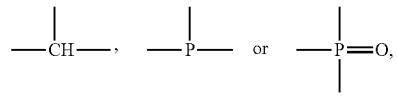

and wherein the diacid monomer, the esterified diacid monomer, or the combination thereof and the polyol monomer meet the following conditions: (a) the diacid monomer, the esterified diacid monomer or the combination thereof comprises (2) furan dicarboxylic acid, dialkyl furandicarboxylate, or the combination thereof and spiro-diacid or (b) the polyol monomer comprises (4) $C_2$-$C_{14}$ polyol and spiro-diol, and wherein when the diacid monomer, the esterified diacid monomer, or the combination thereof includes 1 part by mole of (1) furan dicarboxylic acid, dialkyl furandicarboxylate, or the combination thereof, and the polyol monomer includes 1 to 3 parts by mole of (4) $C_2$-$C_{14}$ polyol and spiro-diol, an amount of the spiro-diol is 500 ppm to 2000 ppm based on a weight of the furan dicarboxylic acid, dialkyl furandicarboxylate, or the combination thereof, and wherein when the diacid monomer, the esterified diacid monomer, or the combination thereof includes 1 part by mole of (2) furan dicarboxylic acid, dialkyl furandicarboxylate, or the combination thereof and spiro-diacid, and the polyol monomer includes 1 to 3 parts by mole of (3) $C_2$-$C_{14}$ polyol, an amount of the spiro-diacid is 500 ppm to 2000 ppm based on a weight of the furan dicarboxylic acid, dialkyl furandicarboxylate, or the combination thereof.

6. The method as claimed in claim 5, wherein the furan dicarboxylic acid includes 2,5-furan dicarboxylic acid, 3,4-furan dicarboxylic acid, 2,3-furan dicarboxylic acid, or a combination thereof.

7. The method as claimed in claim 5, wherein the dialkyl furandicarboxylate includes dimethyl furan-2,5-dicarboxylate, dimethyl furan-3,4-dicarboxylate, dimethyl furan-2,3-dicarboxylate, or a combination thereof.

8. The method as claimed in claim 5, wherein the $C_2$-$C_{14}$ polyol includes ethylene glycol, 1,3-propylene glycol, glycerol, 1,4-butylene glycol, 1,5-pentylene glycol, neo-pentylene glycol, 1,6-hexylene glycol, 1,7-heptylene glycol, 1,8-octylene glycol, 1,9-nonylene glycol, decylene glycol, undecylene glycol, dodecylene glycol, tetradecylene glycol, rosin-diol, isosorbide, 2,5-furandiol, or a combination thereof.

* * * * *